(12) United States Patent
Wu

(10) Patent No.: US 10,343,802 B1
(45) Date of Patent: Jul. 9, 2019

(54) METHOD OF PACKAGING AN OBJECT USING AN ARRAY OF FOAM INJECTORS

(71) Applicant: Amazon Technologies, Inc., Seattle, WA (US)

(72) Inventor: Juntao Wu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/634,979

(22) Filed: Jun. 27, 2017

(51) Int. Cl.
| | |
|---|---|
| *B29C 44/02* | (2006.01) |
| *B29C 44/12* | (2006.01) |
| *B29C 45/00* | (2006.01) |
| *B29C 65/00* | (2006.01) |
| *B65B 31/00* | (2006.01) |
| *B65B 55/20* | (2006.01) |
| *B65B 57/10* | (2006.01) |
| *B29K 105/04* | (2006.01) |
| *B65D 81/113* | (2006.01) |

(52) U.S. Cl.
CPC .............. *B65B 55/20* (2013.01); *B29C 44/02* (2013.01); *B29C 44/1266* (2013.01); *B29C 45/0055* (2013.01); *B29C 66/00145* (2013.01); *B65B 31/00* (2013.01); *B65B 57/10* (2013.01); *B65D 81/113* (2013.01); *B29K 2105/04* (2013.01); *B29K 2995/0025* (2013.01)

(58) Field of Classification Search
CPC .... B65B 55/20; B29C 44/1266; B65D 81/113
USPC ............................ 53/472; 206/524; 264/46.4
See application file for complete search history.

(56) References Cited

U.S. PATENT DOCUMENTS

| | | | | |
|---|---|---|---|---|
| 3,642,400 A | * | 2/1972 | Theodorsen ........ | B29C 44/1266 249/162 |
| 3,870,741 A | * | 3/1975 | Kuhn .................. | B29C 44/1266 206/459.5 |
| 3,999,736 A | * | 12/1976 | Theodorsen ........ | B29C 44/1266 249/61 |
| 4,136,141 A | * | 1/1979 | Bauer et al. ............ | B65B 55/20 206/524 |
| 4,532,093 A | * | 7/1985 | O'Malley et al. ..... | B29O 33/36 264/101 |
| 5,633,017 A | * | 5/1997 | Sebag et al. ............ | B29C 33/36 249/160 |

(Continued)

FOREIGN PATENT DOCUMENTS

JP       05193628 A  *  8/1993   ............. B65B 55/20

*Primary Examiner* — Stephen F. Gerrity
(74) *Attorney, Agent, or Firm* — BakerHostetler

(57) ABSTRACT

A method of packaging an object includes positioning the object on an array of foam injectors, each of which is proximate at least one other foam injector in the array along a first direction and also abuts at least a second other foam injector in the array along a second direction substantially perpendicular to the first direction. Each foam injector in the array is configured to translate along a third direction that is substantially perpendicular to the first and second directions. The method includes translating a first subset of the foam injectors along the third direction so as to define a mold that surrounds the object with respect to the first and second directions and injecting liquid foam into the mold from a second subset of the foam injectors so as to enclose the object in liquid foam with respect to the first and second directions.

15 Claims, 11 Drawing Sheets

(56) References Cited

U.S. PATENT DOCUMENTS

| 8,155,775 B2* | 4/2012 | Batchelder | B65D 81/113 |
| | | | 264/308 |
| 10,183,424 B1* | 1/2019 | Lisso et al. | B29O 44/1266 |
| 2017/0129630 A1* | 5/2017 | Weibel et al. | B65B 55/20 |
| 2018/0141685 A1* | 5/2018 | Colson et al. | B65D 81/022 |

* cited by examiner

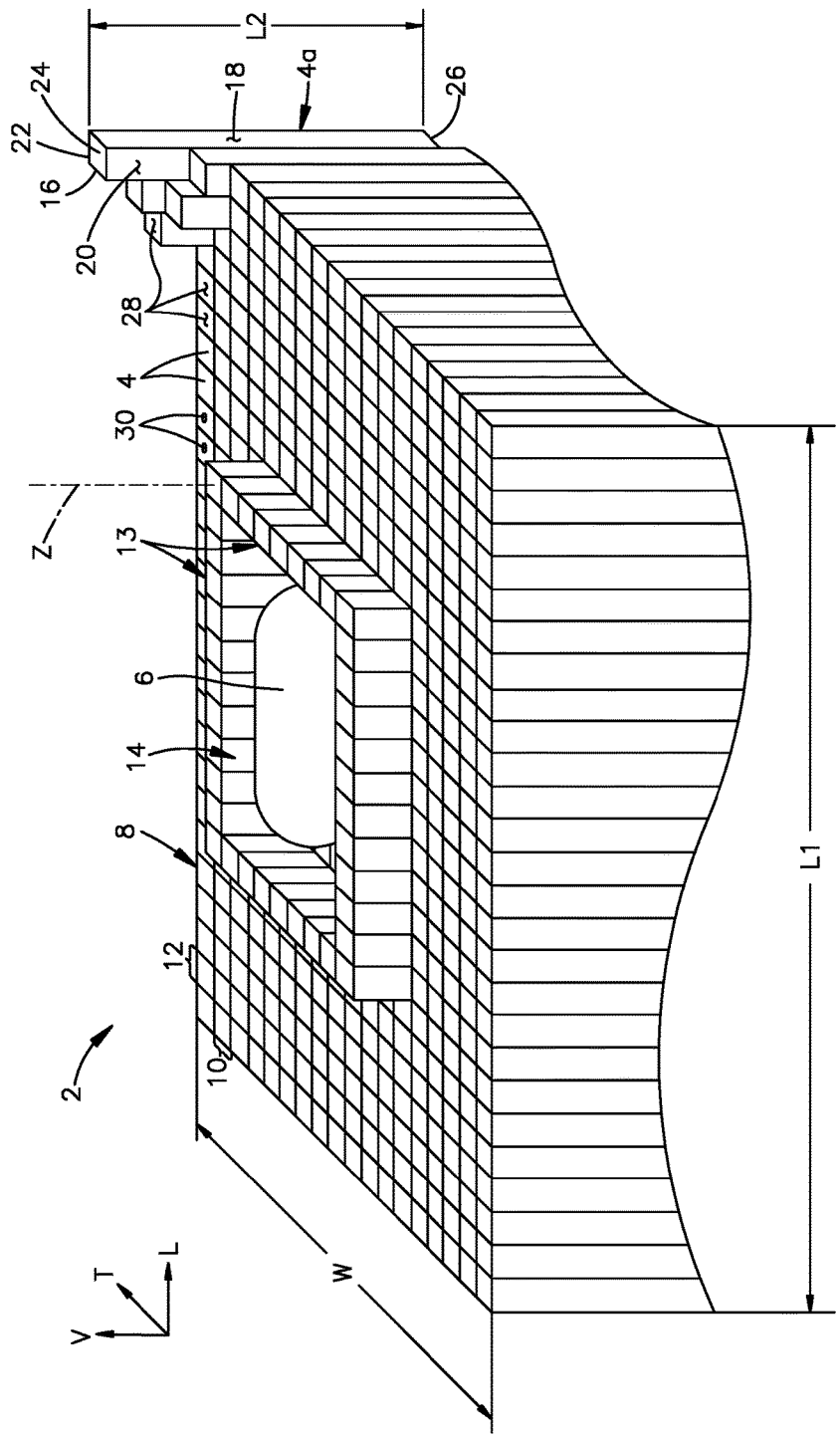

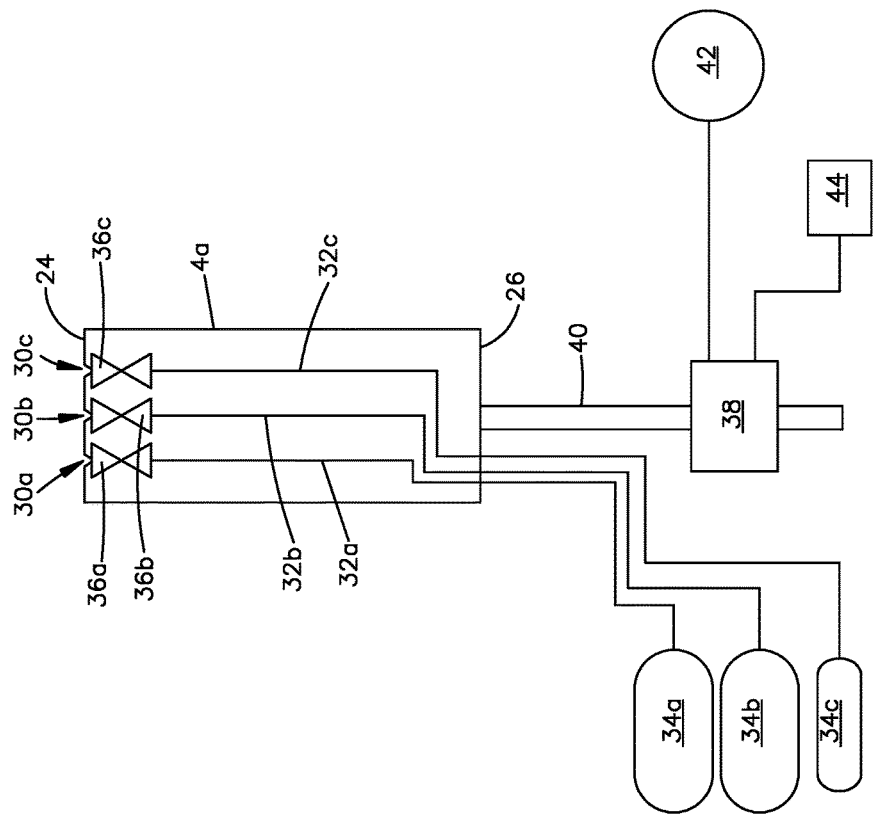
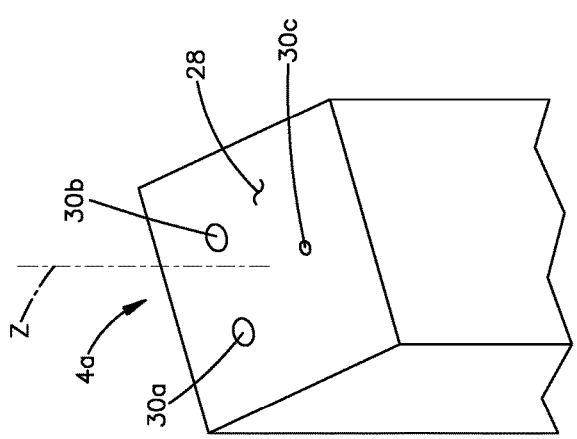

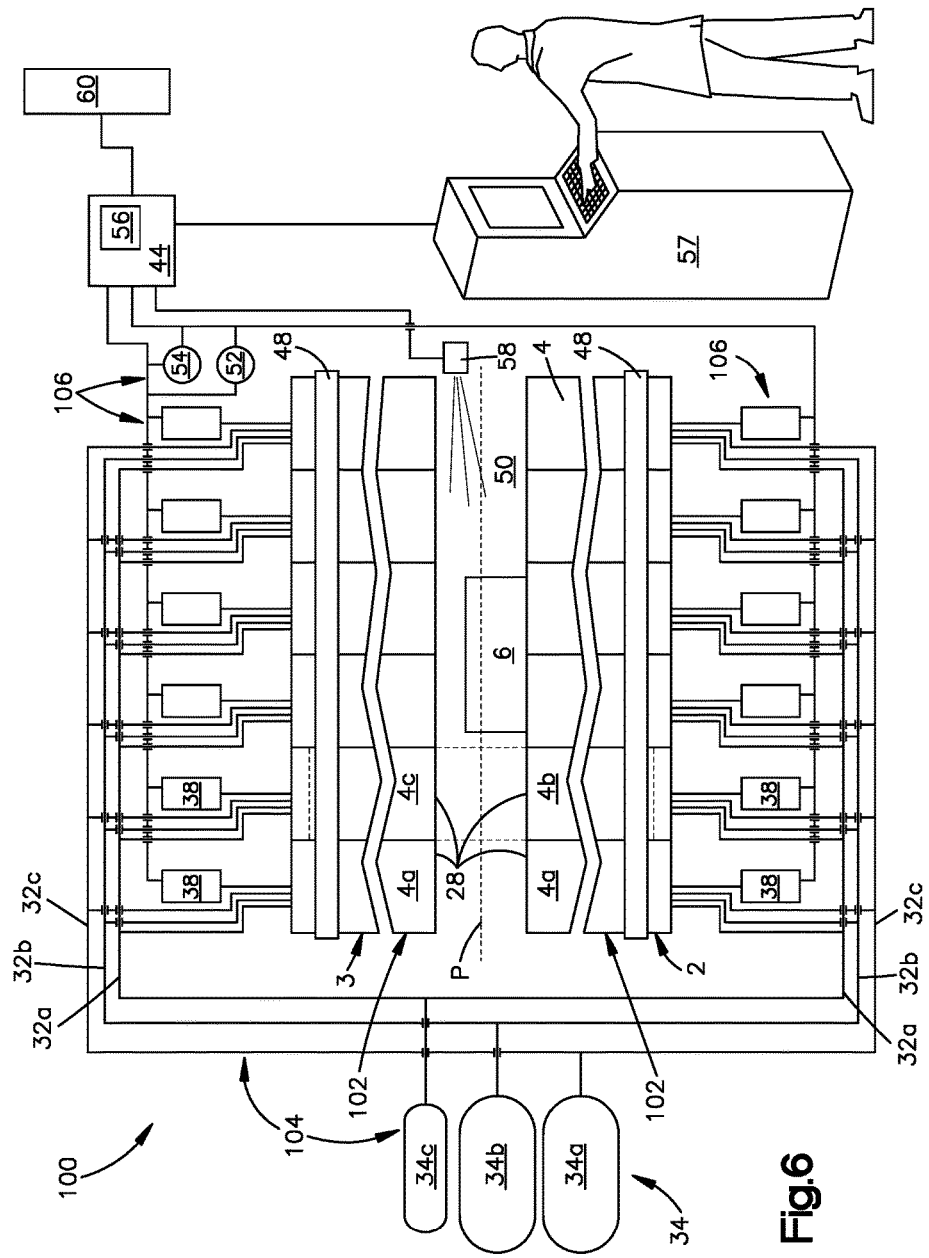

METHOD OF PACKAGING AN OBJECT USING AN ARRAY OF FOAM INJECTORS

BACKGROUND

In a materials handling facility, such as an order fulfillment center, multiple customer orders are received, where each order specifies one or more items from inventory to be shipped to the customer that submitted the order. To fulfill the customer orders, the items may be retrieved, or picked, from inventory (which may also be referred to as stock storage) in the materials handling facility. Under direction of a sorting control system, picked items may be singulated and then inducted into a conveyance mechanism that routes the items to particular destinations, such as sorting stations, in a conveyance route in accordance with the customer orders currently being processed. From the sorting station, the items can be directed to an order processing station, such as a packing station at which one or more units of items for an order are processed, packed, and labeled for shipping to the customer.

Oftentimes during packaging, one or more items are placed in a box along with a filler material that is intended to minimize shifting during transport and to act as shock absorber. In many instances, the box that is shipped to a customer contains only one item.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a perspective view of an array of liquid injectors for packaging an object, according to an embodiment of the present disclosure;

FIG. 2 shows a perspective view of a port arrangement of an injector of the array of FIG. 1, according to an embodiment of the present disclosure;

FIG. 3 shows a diagram of the injector of FIG. 2, according to an embodiment of the present disclosure;

FIG. 6 shows a diagram of a packaging system employing the array of injectors shown in FIG. 1, according to an embodiment of the present disclosure;

DETAILED DESCRIPTION

Figure 5:
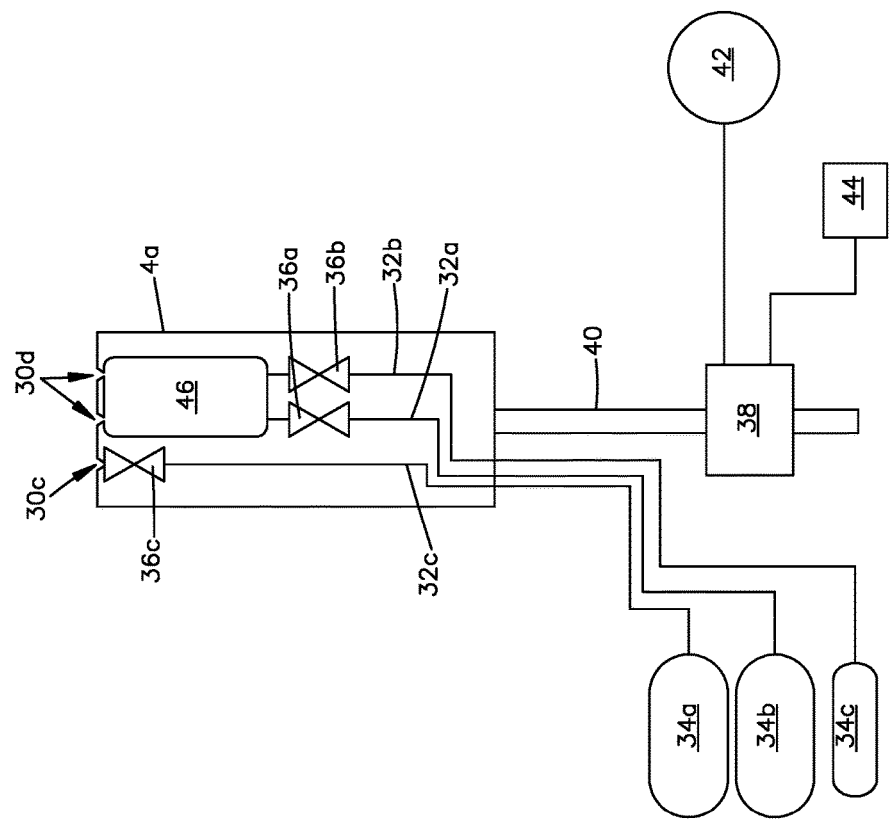
FIG. 5 shows a diagram of the injector of FIG. 4, according to an embodiment of the present disclosure.

The present disclosure pertains to a system of packaging items, such as that performed in an order fulfillment center. In a preferred embodiment, the packaging is formed in a manner that eliminates the need for a cardboard box and filler material for packaging the item. Referring to FIG. 1, an array 2 of liquid injectors 4 is shown for packing an object 6. The array 2 is able to change its shape to at least partially define a mold surrounding the object 6. The injectors 4 of the array 2 are also configured to support or encase the object 6 in a liquid that is set-able or hardenable into a robust yet shock-absorbent packaging material that is resistant to vibration and collision damage. For example, the liquid can be a liquid foam that is injectable into the mold defined by the array 2 and capable of solidifying into a solid foam that substantially retains the shape of the mold. By way of non-limiting example, such a foam can be biodegradable urethane foam, which can be applied via a spraying injection process or other injection process. Other liquid foams are within the scope of the present disclosure. The liquid foam can be formed by mixing two constituent liquids together that react with one another and thereafter solidify into a solid foam construct. As used herein, the term "liquid foam" means any liquid that sets into a solid phase that is suitable for shipping an object therein, and is not limited to materials technically defined as "foams." Further, the term "set" encompasses harden, cure, and the like, regardless of whether the solid phase is rigid or compressible.

The array 2 can be arranged in a grid 8 defining rows 10 of injectors 4 extending along a lateral direction L and columns 12 of injectors 4 extending along a transverse direction T that is substantially perpendicular to the lateral direction L. In this manner, the array 2 is two-dimensional along the lateral and transverse directions L, T to define the grid 8. The array 2 (and each row 10 thereof) can define a length L1 along the lateral direction L. The array 2 (and each column thereof) can also define a width W along the transverse direction T. In one example embodiment, the length L and width W of the array 2 can each be sized to encase an object 6 having a maximum dimension of about 40 inches. Sized in this manner, the array 2 can be employed to package over 99% of items in a fulfillment center of the appropriate size. Each injector 4 is separately translatable along a vertical direction V that is perpendicular to each of the lateral and transverse directions L, T. In this manner, selective ones of the injectors 4 can translate along the vertical direction V so as to form a mold 13 that at least partially defines a volume of space 14 into which the liquid foam can be injected to encase the object 6. In this manner, the array 2 is transformable from a two-dimensional array to a three-dimensional array. It is to be appreciated that the lateral and transverse directions L, T can be referred to as a "horizontal" directions. Also, as used herein, each of the lateral, transverse, and vertical directions L, T, V is bi-directional.

Each of the injectors 4 can define an injector body 4a that defines a vertical axis Z that extends along the vertical direction V. Thus, each injector body 4a can translate vertically along its vertical axis Z. Each of the injector bodies 4a in the array 2 can have the same shape as the other injector bodies 4a in the array 2. For example, in the embodiment shown, each injector body 4a can have a substantially cuboid shape. Accordingly, each body 4a can define first and second side surfaces 16, 18 spaced from each other along the lateral direction L and third and fourth side surfaces 20, 22 spaced from each other along the transverse direction T. Each injector body 4a can be configured such that the first, second, third, and fourth side surfaces 16, 18, 20, 22 thereof define a length L2 along the vertical direction V that is greater than a maximum distance that the injector 4 is configured to translate along the vertical direction V.

The bodies 4a can be arranged such that first side surfaces 16 in each column 12 are substantially coplanar, the second side surfaces 18 in each column 12 are substantially coplanar, the third side surfaces 20 in each row 10 are substantially coplanar, and the fourth side surfaces 22 in each row 10 are substantially coplanar. Additionally, the bodies 4a can be arranged such that, in each pair of adjacent columns 12, the adjacent first and second side surfaces 16, 18 can abut one another, and, in each pair of adjacent rows 10, the adjacent third and fourth side surfaces 20, 18 can abut one another. In this manner, the array 2 can be substantially devoid of gaps along the lateral and transverse direction L, T, except, of course, where at least one of the bodies 4a is translated vertically with respect to another one of the bodies 4a to define such a gap, as well as for clearances between adjacent sidewalls for enabling a body 4a to translate relative to adjacent bodies 4a.

Each injector body 4a in the array 2 can define a first end 24 and a second end 26 spaced from the first end along the vertical axis Z of the body 4a. At the first end 24, the body 4a can define a first or primary end surface 28 that defines one or more ports 30 configured to inject a fluid, such as liquid foam, therefrom. In this manner, select ones of the injectors 4 can inject liquid foam into molds defined between other sidewalls of the injectors 4. The first end surface 28 of each injector body 4a faces in a forward direction F along the vertical axis Z, which refers to the direction in which the liquid foam flows through the port 30 and away from the injector body 4a during injection. The second ends 26 of each body 4a are spaced from the first end 24 in a rearward direction R along the vertical axis Z opposite the forward direction F. It is to be appreciated that, in the embodiments illustrated herein, the forward and rearward directions F, R are mono-directional and are each oriented along the bi-directional vertical direction V. The first end surfaces 28 of the injector bodies 4a are also configured to support the object 6 during various phases of the package molding process.

Referring now to FIG. 2, a port arrangement of the injector body 4a is shown according to one example embodiment. In this embodiment, the injector body 4a is configured for separately injecting two constituent liquids that mix upon injection so as to comprise the liquid foam. The first end surface 28 of the body 4a can define a first port 30a for injecting a first of the constituent liquids and a second port 30b for injecting a second of the constituent liquids. The first end surface 28 of the body 4a can also define a third port 30c for injecting pressurized gas, as discussed in more detail below. In some embodiments, such as those employing urethane foam, the solid foam can comprise about 80% air, which advantageously reduces the amount of liquid foam necessary to complete the packaging molding process, resulting in cost savings for the fulfillment center and also reducing the amount of foam waste in the environment.

As shown in FIG. 3, the first port 30a can be in fluid communication with a first conduit 32a that extends through the injector body 4a and away from the second end 26 thereof to a first reservoir 34a that contains the first constituent liquid. Similarly, the second port 30b can be in fluid communication with a second conduit 32b that extends through the injector body 4a and away from the second end 26 thereof to a second reservoir 34b that contains the second constituent liquid. In other embodiments, such as those employing certain foams other than urethane foam, the first reservoir 34 can contain the liquid foam and the second reservoir 34b can contain water. With continued reference to FIG. 3, the third port 30c can also be in fluid communication with a third conduit 32c that extends through the injector body 4a and away from the second end 26 thereof to a third reservoir 34c that contains pressurized gas, such as compressed air. A first valve 36a can be interposed between the first conduit 32a and the first port 30a; a second valve 36b can be interposed between the second conduit 32b and the second port 30b; and a third valve 36c can be interposed between the third conduit 32c and the third port 30c. The first and second conduits 32a,b can each be pressurized so that the first and second constituent fluids are injected through their respective ports 30a,b upon opening of the first and second valves 36a,b, respectively. The first, second, and third valves 36a-c can be configured to open and close simultaneously for optimal mixing of the first and second constituent liquids after injection.

The injector body 4a can be coupled to an actuator 38 that is configured to translate the body 4a along the vertical direction V (along its vertical axis Z) as needed during the package molding process. For example, as shown in FIG. 3, the actuator 38 can be coupled to a push rod 40 that extends from the second end 26 of the body 4a. The push rod 40 can optionally be configured for telescoping elongation. The actuator 38 can be configured to selectively apply forward or rearward drive forces so as to precisely control the speed and position of the body 4a along the vertical direction V. The actuator 38 can be any type of actuator capable of controlling linear movement of the injector body 4a. By way of non-limiting example, the actuator 38 preferably is a linear actuator and can be operated pneumatically, hydraulically, or electro-mechanically, such as by a screw. The actuator 38 can be coupled to a source 42, which can be a reservoir of hydraulic fluid, a canister of compressed air, or an electric supply, by way of non-limiting example. In one example embodiment, the actuator 38 can be a solenoid-controlled linear actuator that is electric communication with an electrical power source. Other types of actuators are within the scope of the present embodiments. The actuator 38 can be in communication with a control unit, such as a processor 44, configured to control operation of the actuator 38 so as control the position of the injector body 4a along the vertical direction V. The processor 44 can also be in communication with each valve 36a-c of the injector 4 and can be configured to open and close the valves 36a-c so as to precisely control injection of the constituent liquids by the injector 4.

Figure 4:
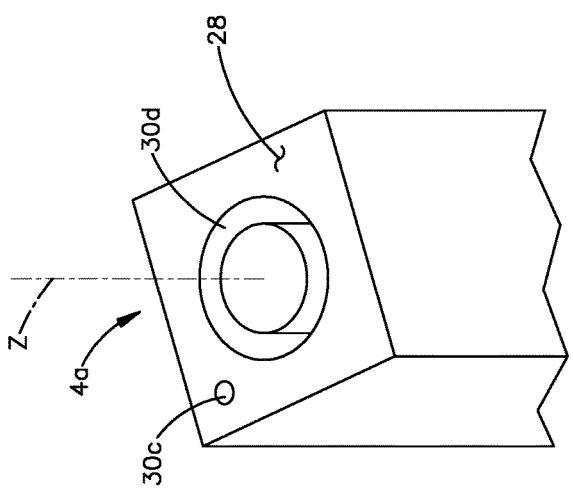
FIG. 4 shows a perspective view of an alternative port arrangement of the injector of FIG. 2, according to an embodiment of the present disclosure.

Referring now to FIGS. 4 and 5, an alternative port arrangement is shown for ejecting pre-mixed liquid foam from the injector body 4a. In this embodiment, the first end surface 28 of the injector body 4a can optionally define a single foam port 30d that is in fluid communication with an internal mixing chamber 46 within the body 4a. The single foam port 30d can have an aperture that is a circular ring.

The first and second conduits 32a,b can extend from the mixing chamber 46, through the injector body 4a and away from the second end 26 thereof to the first and second reservoirs 34a,b, respectively that contain the constituent liquids of the liquid foam. The first end surface 28 can also define an additional port 30c for injecting pressurized gas, as described above.

The first valve 36a can be interposed between the first conduit 32a and the mixing chamber 46 and the second valve 36b can be interposed between the second conduit 32b and the mixing chamber 46. The first and second valves 36a,b can be configured to open and close simultaneously for optimal mixing of the first and second constituent liquids within the mixing chamber 46. The first and second conduits 32a,b can each be pressurized so that the pre-mixed liquid foam exits the mixing chamber 46 and injects through the port 30d upon opening of the first and second valves, respectively.

Referring to FIG. 6, a system 100 for automatically packaging objects 6 within foam can include an injector assembly 102 that includes the array 2, which can be termed a "lower" array, and a second or upper array 3 of injectors 4 spaced from the lower array 2 along the vertical direction V. Each array 2, 3 can be supported by a brace or support member 48 that maintains the injectors 4 therein in their respective lateral and transverse positions. While not shown in FIG. 6, the support member 48 of each array 2, 3 can comprise portions of a rack assembly that supports both arrays 2, 3.

Each array 2, 3 of injectors 4 can be configured as shown in FIG. 1, with the upper array 3 inverted in a manner vertically aligned with and facing the lower array 2. In this manner, each injector body 4c of the upper array 3 can be substantially aligned with its counterpart 4b in the lower array 2. Additionally, the first, second, third, and fourth side surfaces 16, 18, 20, 22 of each injector body 4a of the upper array 3 can be substantially coplanar with those of its counterpart in the lower array 2. The first end surfaces 28 of each injector body 4a in the lower array 2 can be configured to support an object 6 thereon during various phases of the package molding process. Thus, the first end surfaces 28 of the injector bodies 4a of the lower array 2 can also be termed "support" surfaces, and these surfaces can collectively define a support surface of the lower array 2.

For each of the first end surfaces 28 of the lower array 2, the forward direction F can be upward along the vertical direction V toward the counterpart first end surface 28 of the upper array 3. Similarly, for each of the first end surfaces 28 of the lower array 2, the forward direction F can be downward along the vertical direction V toward the counterpart first end surface 28 of the lower array 2. In this manner, the injector assembly 102 can define a volume of space 50 between the first end surfaces 28 of the upper array 3 and the first end surfaces 28 of the lower array 2. For the injector bodies 4a of the upper array 3, the forward (i.e., downward) direction F can be termed an "internal" direction with respect to the volume of space 14, and the rearward (i.e., upward) direction R can be termed an "external" direction with respect to the volume of space 14. For the injector bodies 4a of the lower array 2, the forward (i.e., upward) direction F can be termed the "internal" direction with respect to the volume of space 14, and the rearward (i.e., downward) direction R can be termed the "external" direction with respect to the volume of space 14. Thus, in the illustrated embodiment, the respective internal directions of the injector bodies 4a of the lower and upper arrays 2, 3 face toward each other, and the respective external directions of the bodies 4a of the lower and upper arrays 2, 3 face away from each other.

The injector assembly 102 in FIG. 6 is shown in a first configuration in which the first end surfaces 28 of the lower and upper arrays 2, 3 are separated from each other by a distance so that the object 6 can be placed on the first end surfaces 28 of the lower array 2. In the first configuration, the first end surfaces 28 of the upper array 3 can each be substantially coplanar and the first end surfaces 28 of the lower array 2 can each be substantially coplanar. Each injector body 4a can be configured to translate in the forward direction F at least to, and optionally beyond, a horizontal mid-plane P of the injector assembly 102, as shown in phantom lines of a representative pair of injectors 4b, 4c. The first configuration can be the "resting" configuration of the injector assembly 102. However, in other embodiments, the resting configuration can be a configuration in which the first end surfaces 28 of the lower and upper arrays 2, 3 abut one another at the horizontal mid-plane P. It is to be appreciated that other resting configurations of the injector assembly 102 are within the scope of the present disclosure.

With continued reference to FIG. 6, the packaging system 100 can include a fluid delivery sub-system 104 (which can also be termed a "system") for supplying the liquid foam to each of the injectors 4. For example, the fluid delivery system 104 can include a bank of reservoirs 34 connected by conduits 32a-c to each of the injectors 4. The reservoir bank 34 can include, for example, the first reservoir 34a, the second reservoir 34b, and the third reservoir 34c. The reservoirs 34a-c can be configured as set forth above with reference to FIG. 3. The reservoir bank 34 can include additional reservoirs, as needed. Each reservoirs can supply fluid to at least one of the injectors 4 and as, as shown, to as many as all of the injectors of the system 100. In other embodiments, each array 2, 3 of injectors 4 can each have its own bank of reservoirs 34. Other reservoir configurations are also within the scope of the present disclosure.

The system 100 can also include an actuation sub-system 106 (which can also be termed a "system") for independently operating each of the actuators 38 so as to define various molds around the object 6, as needed. The actuation system 106 can include one or more supply sources 52 in communication with the actuators 38 of each array 2, 3. In embodiments where the actuators 38 are electrically or electro-mechanically operated, such as with solenoid linear actuators, for example, the one or more supply sources can include a power supply 52. In embodiments where the actuators 38 are pneumatically or hydraulically operated, the actuation system can include a fluid supply 54, such as of compressed air or hydraulic fluid, respectively.

The actuation system 106 and the fluid delivery system 104 can each be in communication with a control unit, such as a processor 44. The processor 44 can be in communication with the actuator 38 and fluid delivery components of each injector 4 so as to precisely control the vertical position of each injector body 4a and to precisely control injection of liquid foam therefrom. The processor 44 can be in communication with computer memory 56 and can be configured to operate software for controlling operation of the system 100. Optionally, the processor 44 can also be in communication with an operator station 57, which can include a view screen and controls allowing a human operator to monitor or affect operation of the system, if desired. However, it is to be appreciated that the system 100 can be fully automated without the need for human interaction during operation.

With continued reference to FIG. 6, the system can include at least one sensor 58 for identifying a size and shape of the object 6 to be packaged. The sensor 58 can be an optical sensor that generates image data, or other well-known means for generating image or dimension information. The image data from the sensor 58 can be transmitted to the processor 44, which can execute software so at to match the object 6 with unique object identification data stored in the computer memory 56. The unique object identification data can include data identifying the size dimensions and three-dimensional shape of the object 6 in the injector assembly 102. In some embodiments, the image sensor 58 can be an LED- or laser-based light curtain that is movable relative to the object 6 so as to generate scan data of the object 6. In some such embodiments, the light curtain can be stationary and the object 6 can be conveyed therethough. In other such embodiments, the object 6 can be stationary while the light curtain traverse the object 6 so as to generate scan data that can be interpreted by the processor 44. In further such embodiments, a camera can also communicate image data of the object 6 to the processor 44, which can then interpret the image data from the camera along with the scan data from the light curtain to extrapolate precise size dimensions of the object 6. In other embodiments, the sensor 58 can be an optical scanner configured to scan an identification label, such as a barcode, carried by the object 6.

The processor 44 can be in communication with a server 60, such as a remote server 60, having access to a database of precise dimension information for each object 6 stored in the fulfillment center. It is to be appreciate that the sensor 58 can be located with the injector assembly 102, as shown, or can be remote from the injector assembly 102, such as at a scanning station elsewhere along the conveyance route in the fulfillment center. It is to be appreciated that other sensor types for obtaining dimension data of objects 6 are within the scope of the present disclosure.

Operation of the system 100 for packaging the object 6 in a foam package will now be discussed. FIGS. 7 through 12 illustrate aspects of the injector assembly 102 at various phases of packaging an object 6 therewith.

Figure 7:
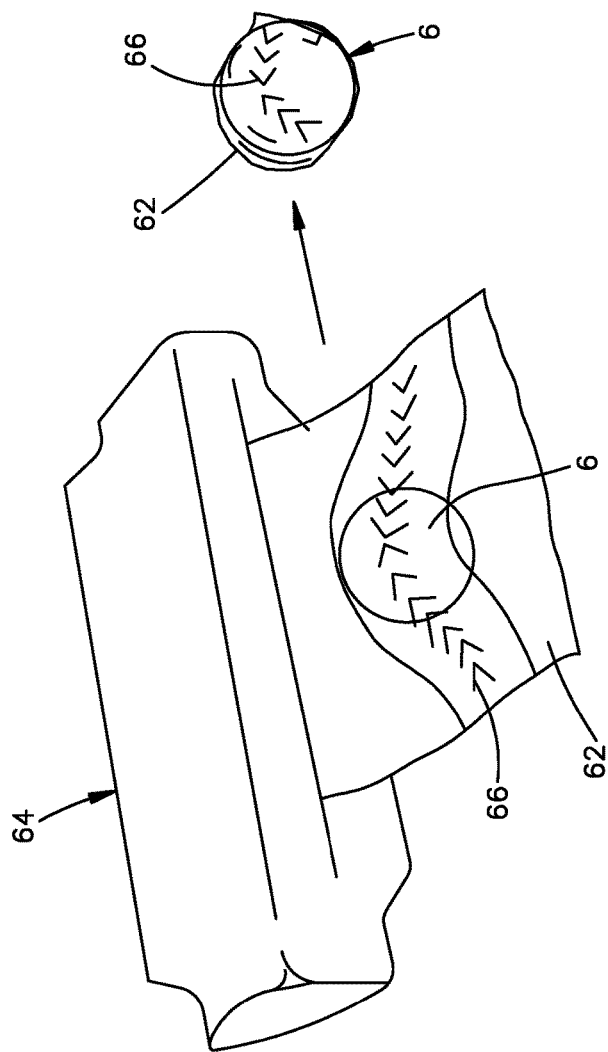
FIG. 7 shows a perspective view of an object being sealed in a film prior to packaging, according to an embodiment of the present disclosure.

As shown in FIG. 7, an item can be prepared for encasement within the liquid foam by being wrapped within a thin layer of film 62 and vacuum sealed therein with a vacuum sealing machine 64 so that the film 62 closely conforms to the shape of the object 6. In some embodiments, a tag or barcode having unique object identification data encoded thereon can be carried by the object 6. In such embodiments, the tag can be transferred to an outer surface of the sealed film 62 so that is can be scanned by the sensor 58. In other embodiments, the sensor 58 can generate image data of the sealed object 6 and the processor 44 can execute image recognition software on the image data so as to identify the shape and dimensions of the sealed object 6. In such embodiments, the film 62 can be substantially opaque so as to minimize reflections emanating from the object 6, which reflections could potentially confuse the processor 44. Accordingly, the film 62 can comprise a black plastic material. The film 62 can also define one or more visual patterns 66 allowing an operator to position the object 6 within the film 62 so that the certain characteristics of the sealed object 6 can be identified, such as a particular predetermined orientation in which the object 6 is to sit upon the support surface of the injector assembly 102, by way of non-limiting example. The film 62 also has the advantage of protecting the object 6 from absorbing any unfavorable odors of the foam. It is to be appreciated that the dimension information of the object 6 can be obtained after or prior to sealing within the film 62. It is also to be appreciated that some objects 6 need not be inserted within the film 62 for encasement within the liquid foam.

Based on the acquired dimension information of the object 6, acquired data pertaining to the shape and size dimensions of the object 6, the processor 44 can calculate a predetermined volume of space (referred to herein as the "package volume") for the package mold to be defined by the injector arrays 2, 3. The processor 44 can also calculate an amount of liquid foam to be injected into the package volume. Alternatively, a predetermined package volume and predetermined amount of liquid foam for each object 6 in the fulfillment center can be accessible to the processor 44 via the computer memory 56 or the database so that the processor 44 can retrieve the predetermined values based on the unique identification information obtained by the sensor 58. It is to be appreciated that, because the package formed by the present system 100 maintains the object in position within the package and protects the object from shock and vibration, the system 100 can effectively design a package mold that requires less packaging material and overall package volume for each object 6.

Figure 8:
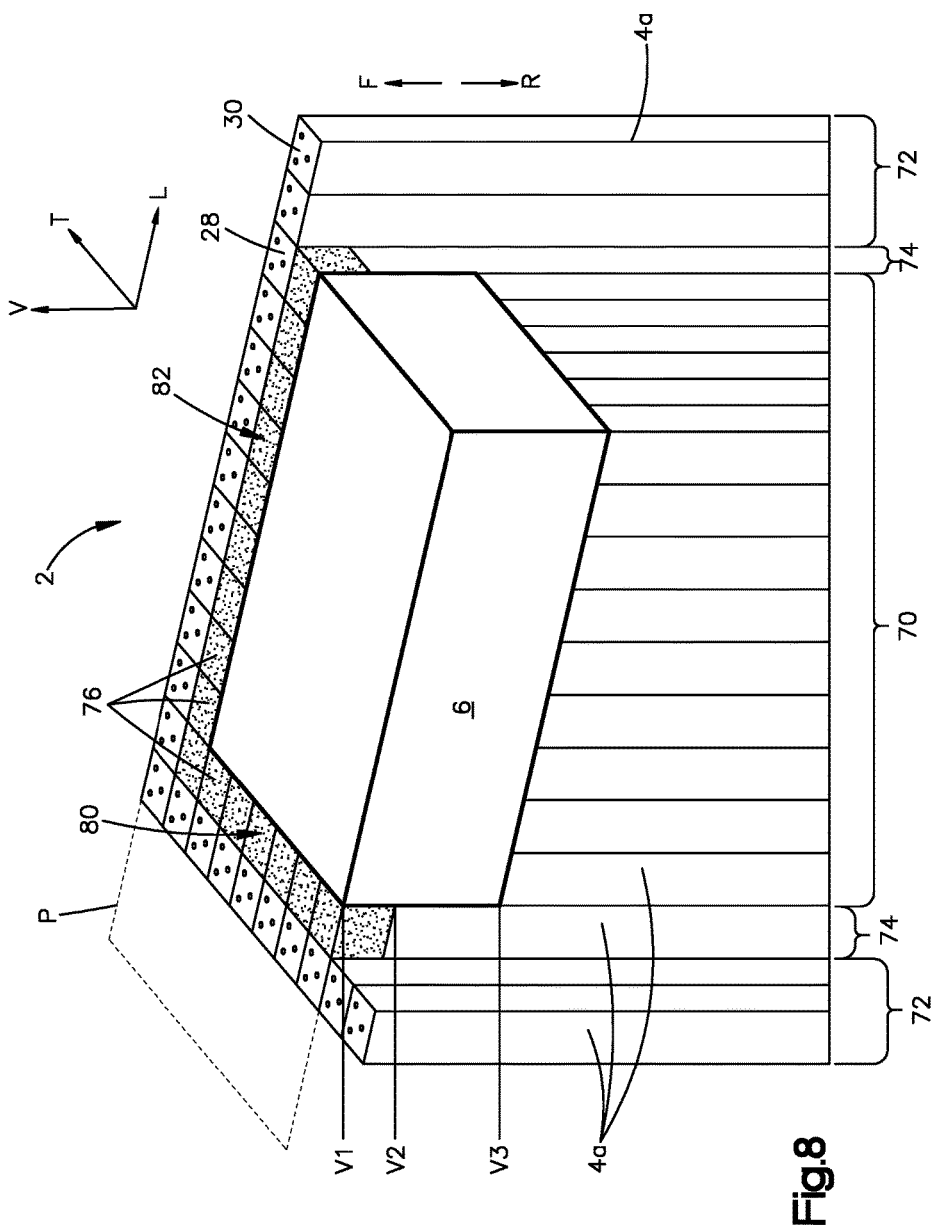
FIG. 8 shows a partial perspective view of an object during a phase of packaging by the system of FIG. 6, according to an embodiment of the present disclosure.

Referring now to FIG. 8, the lower half of an object 6 to be packaged is shown sitting upon the first end surfaces 28 of some of the injector bodies 4a in the lower array 2. The view of FIG. 8 can effectively be a partial perspective, sectional view of the injector assembly 102 taken along the horizontal mid-plane P thereof, which defines an intersection between the top and bottom halves of the object 6. While the upper half of the object 6 and the upper array 3 of injectors 4 are omitted in the view of FIG. 8 for visualization purposes, it is to be appreciated that the upper half of the object 6 and the upper array 3 of injectors 4 can effectively be a reflection of the lower array 2 and lower half of the object 6 about the horizontal mid-plane P. Thus, the operation of the upper array 3 of injectors 4 can mirror the following description of the operation of the lower array 2 of injectors 4.

With continued reference to FIG. 8, the packaging system 100 can identify one or more of a first subset 70 of injector bodies 4a in the lower array 2 that at least partially underlie the object 6 along the vertical direction, a second subset 72 of injector bodies 4a that are spaced from the object 6 with respect to at least one of the lateral and transverse directions, and a third subset of injector bodies that are positioned between the object 6 and an least one injector 4 of the second subset 72 with respect to at least one of the lateral and transverse directions L, T.

Figure 9:
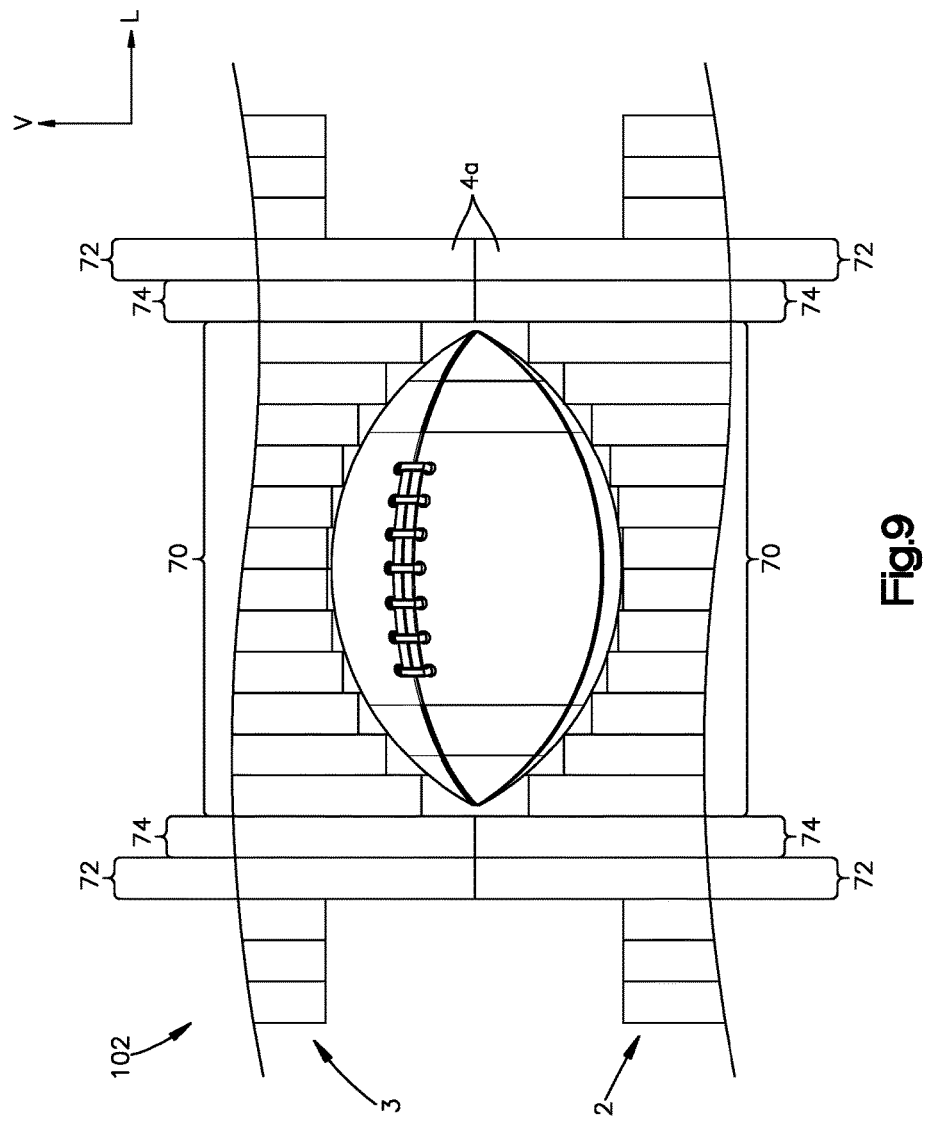
FIG. 9 shows a partial side view of another object during a phase of packaging by the system of FIG. 6.

While the object 6 shown in FIG. 8 has a substantially cuboid configuration with a flat bottom surface oriented parallel with the horizontal mid-plane P, it is to be appreciated that, with objects 6 having a non-planar or irregularly shaped bottom surface, as shown in FIG. 9, the injector bodies 4a of the first subsets of the lower and upper arrays 2, 3 can translate along the vertical direction so that their first end surfaces 28 effectively align with the contours of the top and bottom of the object 6 along the vertical direction. In this manner, the system 100 can control the orientation in which the object 6 is encased in the package. This capability is particularly advantageous with delicate items or irregularly shaped items.

Referring again to FIG. 8, to define the lateral and transverse bounds of the mold (and thus of the package volume), the second subset 72 of injector bodies 4a can be translated along the forward direction F to a first vertical location V1 at the horizontal mid-plane P, as shown. At the first vertical location V1, the first end surfaces 28 of the second subset 72 of injector bodies 4a of the lower array 2 can abut the first end surfaces 28 of the second subset 70 of injector bodies 4a of the upper array 3 so as to substantially enclose the object 6 with respect to the lateral and transverse directions L, T (see FIG. 9). The third subset 74 of injector bodies 4a can be translated to a second vertical location V2 proximate the horizontal mid-plane P. From the second vertical location V2, the third subset 74 of injector bodies 4a can begin injecting liquid foam 76 into the volume of space between: (1) the first end surfaces 28 of the third subset 74 and the horizontal mid-plane P along the vertical direction V; and (2) the inner-facing side surfaces of the second subset 72 and the object 6 along a horizontal direction L, T. Thus, the injectors 4 of the third subset 74 can continue injecting liquid foam 76 as they translate in the rearward direction R to a third vertical location V3 so as to form lateral and transverse sidewalls 80, 82 of the package (that is, as the injectors of the third subset 74 retract, the space formed by the retraction is filled with foam from the injectors 4 to form walls 80, 82 that surround object 6). The third vertical location V3 can be spaced from a bottom surface of the object 6 in the rearward direction R. In the view shown, wherein the object 6 has a flat bottom surface, the third vertical location V3 can be substantially coincident with the first end surfaces 28 of the first subset 70 of injector bodies 4a. In instances where the object 6 has a non-planar bottom surface, the third vertical location V3 can be substantially coincident with the first end surface 28 of at least one of the injector bodies 4a of the first subset 70, such as the externalmost first end surface 28, for example.

Figure 10:
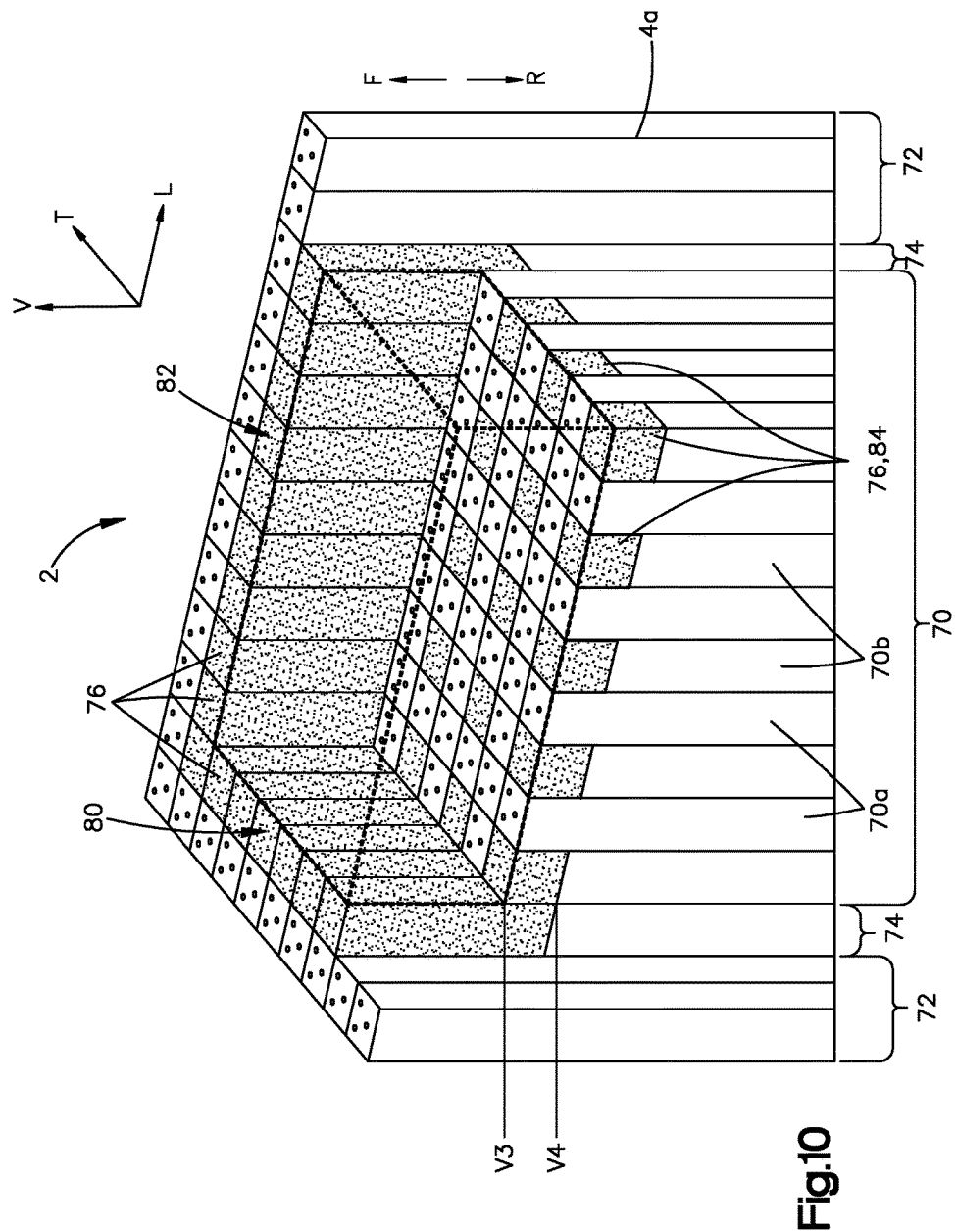
FIG. 10 shows a partial perspective view of an object during another phase of packaging by the system of FIG. 6, according to an embodiment of the present disclosure.

Referring now to FIG. 10, the injector bodies 4a of the second subset 72 can translate in the rearward direction R from the third vertical location V3 to a fourth vertical location V4 and can inject liquid foam 76 into the space vacated by the second subset 72 so as to extend the length of the sidewalls 80, 82 in the rearward direction R. Additionally, a first group 70a of the injector bodies 4a of the first subset 70 can remain in place while a second group 70b of injector bodies 4a of the first subset 70 can translate in the rearward direction R from the third V3 to the fourth vertical location V4 and can inject liquid foam 76 into the space vacated by the second group 70b so as to form supports, such as support columns or pillars 84, of foam 76 abutting the bottom of the object 6. As shown, each of the pillars 84 extends in the forward direction F from fourth vertical location V4. An internal face of each column preferably conforms to the shape of the object against which is abuts.

Figure 11:
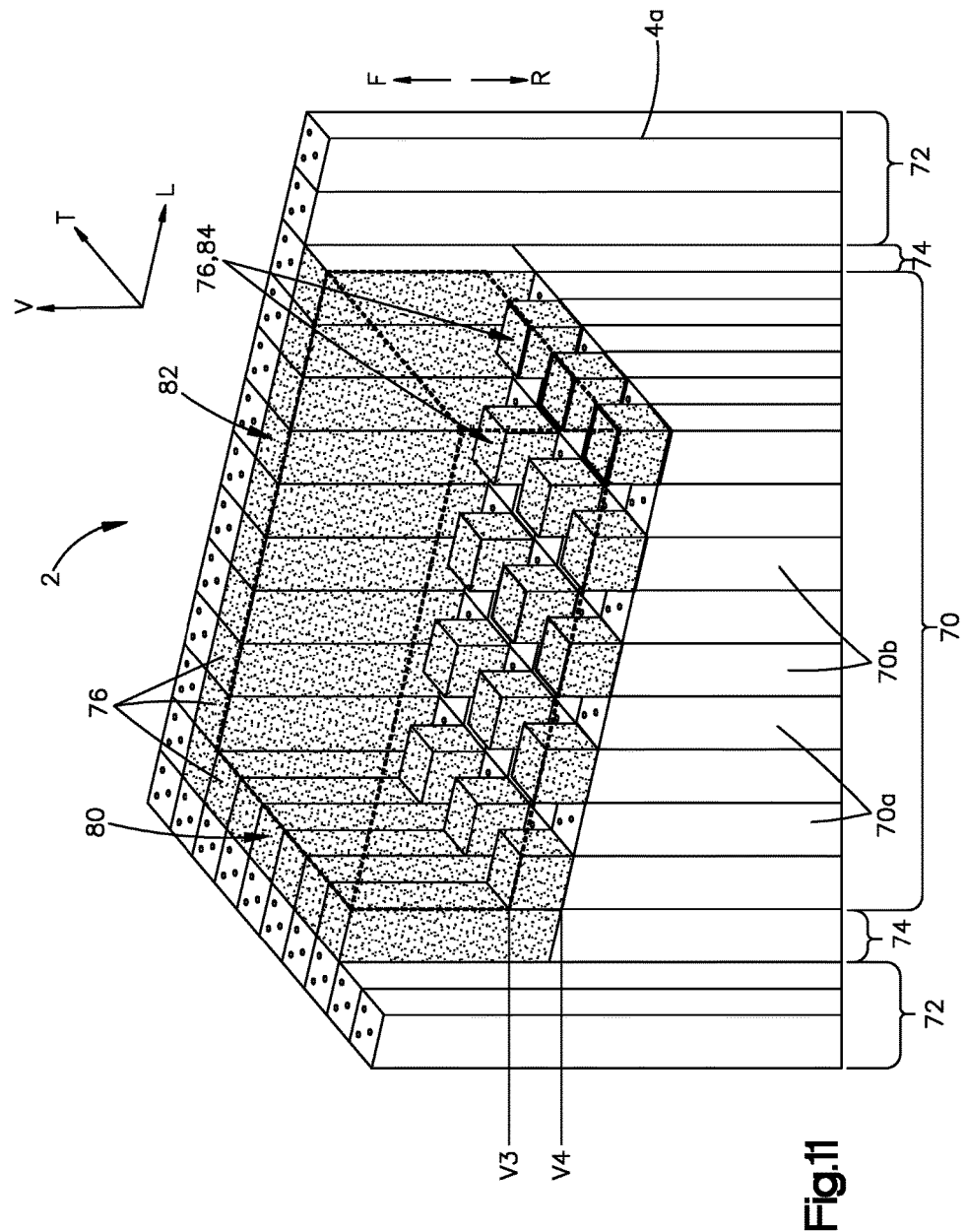
FIG. 11 shows a partial perspective view of an object during an additional phase of packaging by the system of FIG. 6.

Referring now to FIG. 11, after the liquid foam 76 injected from the second group 70b of injector bodies 4a of the first subset 70 solidifies enough to substantially retain the shape in the support pillars 84, the first group 70a of the injector bodies 4a of the first subset 70 can translate in the rearward direction R to the fourth vertical location V4. The first group of injector bodies 4a of the first subset can translate to the fourth vertical location V4 without injecting liquid foam into the vacated space, leaving empty spaces within the package that reduce the amount of liquid foam 76 necessary to complete the package. Thus, at least some of the columns that underlie the object 6 are entirely surrounded by empty space along the lateral and transverse directions L, T.

Figure 12:
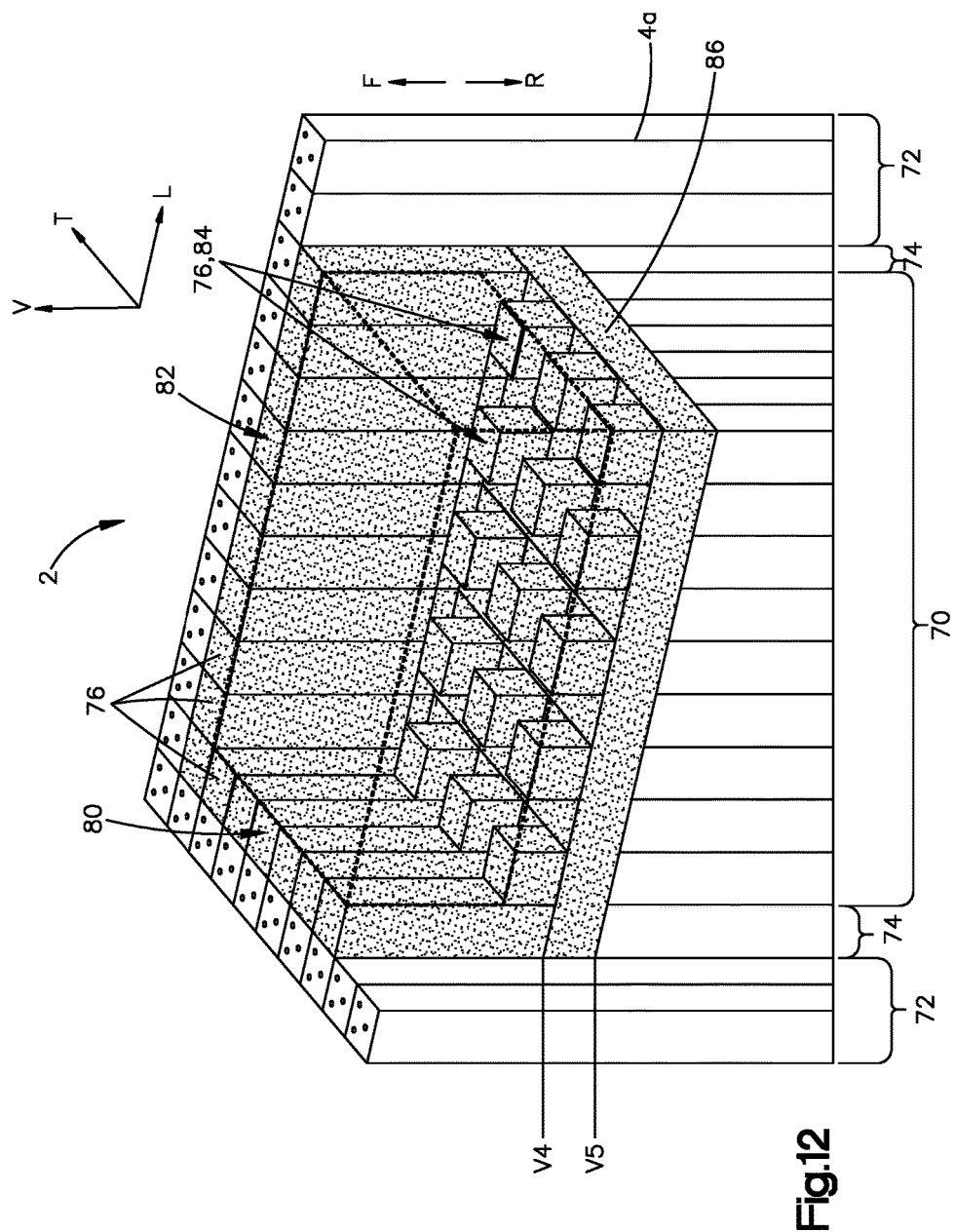
FIG. 12 shows a partial perspective view of an object during a further phase of packaging by the system of FIG. 6.

Referring now to FIG. 12, each injector body 4a of the first, second, and third subsets can translate in the rearward direction R from the fourth vertical location V4 to a fifth vertical location V5 while injecting liquid foam 76 in the spaces therebetween so as to form a bottom wall 86 of the package (or the top wall in the case of the upper array 3). The pillars 84 extend inwardly from the bottom wall 86 to the object 6. The liquid foam constituting the bottom wall 86, the sidewalls 80, 82, and each of the pillars 84 can set such that each of the bottom wall 86, the sidewalls 80, 82, and each of the pillars 84 is monolithic with each other. In this manner, a monolithic, seamless package of robust yet shock- and vibration-resistant material can be formed around the object 6 so as to conform internally to the shape thereof and be substantially ready for shipping. After the foam 76 has set sufficiently, the injector bodies 4a of the second subset 72 can be withdrawn and the formed package 87 (FIGS. 13 and 14) can be removed from the injector assembly 102. Exterior surfaces of the package can be finished for shipping, such as by buffing out or otherwise removing any unwanted protrusions of foam (i.e., "flash") extending therefrom, as needed. A shipping label 88 can be applied to the exterior of the package and the package can then be shipped.

Figure 13:
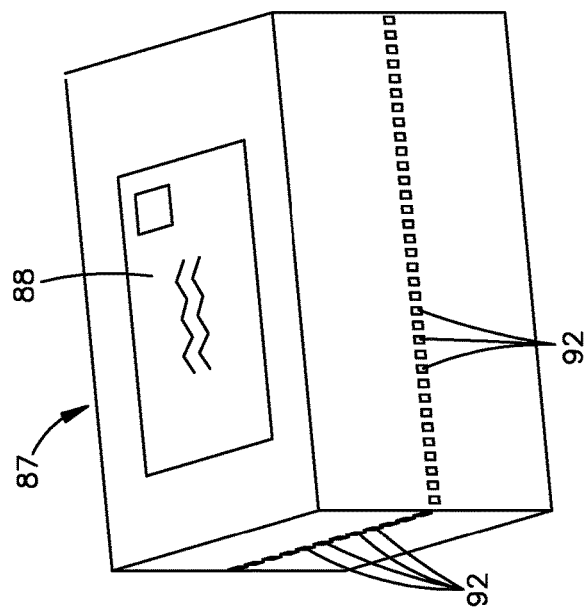
FIG. 13 shows a perspective view of an opening device of a package formed by the system of FIG. 6.
Figure 14:
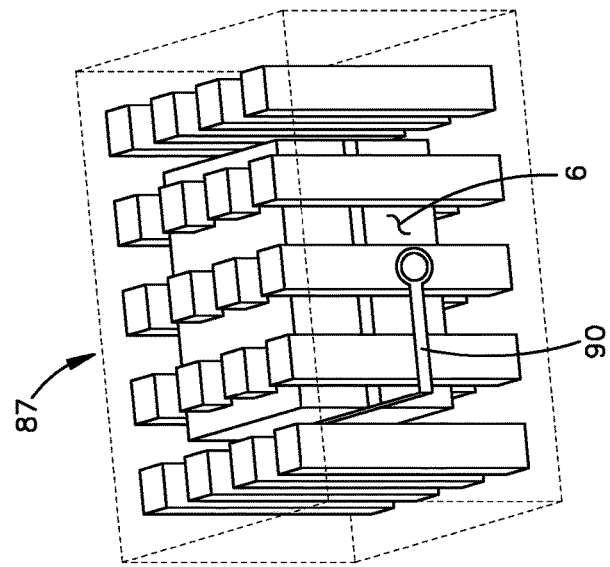
FIG. 14 shows a perspective view of a finished package formed by the system of FIG. 6.

Referring to FIG. 13, a package opening feature, such as a pull string 90, can be disposed around the object 6 during one or more of the various foregoing phases of the package molding process. The pull string 90 can be configured so that is will sever the package 87 without damaging the object 6. In other embodiments, as shown in FIG. 14, after the package molding process is complete, perforations 92 can be machined into the package so as to define a severable opening portion of the package. The perforations 92 can be configured so that the package 87 can be opened without damaging the object 6. It is to be appreciated that other opening features can be employed with the package 87.

In some aspects, an automatic packaging system 100 includes a lower array 2 of injectors 4 facing an upper array 3 of injectors 4. The lower and upper arrays 2, 3, of injectors are spaced from each other along a vertical direction V. Each injector 4 of the upper and lower arrays 3, 2 of injectors includes a body 4a defining a vertical axis Z extending along the vertical direction V, the body 4a further defining a first end 24 and a second end 26 spaced from the first end 24 in an external direction R along the vertical axis Z. The first end 24 is spaced from the second end 26 in an internal direction F along the vertical axis Z opposite the external direction R. The first end 24 defines a first end surface 28 that defines a port 30. Each injector 4 also has an actuator 38 coupled to the body 4a and configured to translate the body 4a in the internal and external directions F, R and a conduit 32 in fluid communication with the port 30 and configured to be in fluid communication with a reservoir 34 spaced from the body 4a with respect to the external direction R. The conduit 32 is configured to communicate a liquid from the reservoir 34 to the port 30. Each injector 4 also has a valve 36 interposed between the conduit 32 and the port 30. The valve 36 is configured to regulate flow of the liquid through the port 30. The system also includes a control unit 44 in communication with each actuator 38 and each valve 36 of the injectors 4 of the upper and lower arrays 3, 2 of injectors. The control unit 44 is configured to control operation of 1) each actuator 38 so as to move selective ones of the injector bodies 4a of each array of injectors along their vertical axes Z so that side surfaces of at least some of the bodies 4a of each array of injectors define an enclosed volume of space surrounding an object 6, and 2) each valve 36 so as to inject the liquid through the ports 30 of selective ones of the injectors 4 and into the enclosed volume of space so as to encase the object 6 in the liquid, wherein the liquid is configured to set into a substantially solid material defining a package 87 that contains the object 6.

In some aspects, a method of packaging an object 6 includes a step of positioning the object 6 on an array 2 of foam injectors 4. Each foam injector 4 in the array 2 of foam injectors is proximate 1) at least one other foam injector 4 in the array 2 of foam injectors along a first direction and 2) at least a second other foam injector 4 in the array 2 of foam injectors along a second direction substantially perpendicular to the first direction. Each foam injector 4 in the array 2 of foam injectors is configured to translate along a third direction that is substantially perpendicular to the first and second directions. The method also includes the step of translating a first subset 72 of the foam injectors along the third direction so as to define a mold 13 that surrounds the object 6 with respect to the first and second directions. The method also includes injecting liquid foam into the mold 13 from a second subset 74 of the foam injectors 4 so as to enclose the object 6 in liquid foam with respect to the first and second directions.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

While the foregoing description distinguishes between certain subsets of components by referring to "first", "second", "third," and so-forth ones of the components, it is to be appreciated that a "first" component in one embodiment or instance can be characterized as a "second" or "third" such component in another embodiment or instance, and vice versa.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method of packaging an object, comprising:
    positioning the object on an array of foam injectors, each foam injector in the array of foam injectors being positioned proximate 1) at least one other foam injector in the array of foam injectors along a first direction and 2) at least a second other foam injector in the array of foam injectors along a second direction perpendicular to the first direction, wherein each foam injector in the array of foam injectors is configured to translate along a third direction that is perpendicular to the first and second directions;
    translating a first subset of the foam injectors along the third direction so as to define a mold that surrounds the object with respect to the first and second directions; and
    injecting liquid foam into the mold from a second subset of the foam injectors so as to enclose the object in the liquid foam with respect to the first and second directions.

2. The method of claim 1, further comprising translating a third subset of foam injectors away from the object along the third direction while injecting liquid foam from the third subset of foam injectors so as to form a layer of foam underlying the object.

3. The method of claim 2, wherein the array of foam injectors is a lower array of foam injectors, an upper array of foam injectors is positioned above the lower array of foam injectors so that the foam injectors of the upper array face the foam injectors of the lower array, and the first translating step further comprises translating a first subset of the foam injectors of the upper array along the third direction so as to abut the first subset of foam injectors of the lower array so as to define the mold.

4. The method of claim 2, wherein the positioning step comprising placing the object so as to overlay at least some of the third subset of foam injectors.

5. The method of claim 4, further comprising, prior to translating the third subset of foam injectors away from the object:
    maintaining a first group of the third subset of foam injectors of the array stationary while translating a second group of the third subset of foam injectors away from the object along the third direction;
    injecting foam from the second group of the third subset of foam injectors into spaces vacated by the second group as the second group translates away from the object; and
    allowing the foam injected from the second group to cure so as to define foam support columns.

6. The method of claim 5, further comprising translating the first group of the third subset of foam injectors away from the object along the third direction, without injecting foam therefrom, so as to define spaces between the foam support columns.

7. The method of claim 6, wherein translating the third subset of foam injectors away from the object comprises translating the first and second groups of the third subset of foam injectors concurrently away from the object along the third direction so as to form the layer of foam underlying the object.

8. The method of claim 1, further comprising vacuum sealing the object in an opaque film prior to the positioning step.

9. The method of claim 1, wherein:
    each foam injector of the array has a body that defines side surfaces; and
    translating the first subset of foam injectors causes the side surfaces of at least some of the bodies of the first subset of foam injectors to collectively define a volume of space surrounding the object at least along the first and second directions so as to define opposed sides of the mold.

10. The method of claim 9, further comprising allowing the liquid foam injected into the mold to cure so as to define at least a portion of a foam package enclosing the object with respect to the first and second directions.

11. The method of claim 10, further comprising translating the first subset of foam injectors away from the object along the third direction so as to expose an exterior of the cured foam, thereby causing the exterior of the cured foam to define an exterior of the foam package containing the object.

12. The method of claim 9, wherein:

the body of each foam injector defines a first end and a second end spaced from each other in the third direction, and the first end defines a first end surface that defines one or more ports; and the method further comprises adjusting the position of at least some of a third subset of foam injectors along the third direction so that the first end surfaces of the at least some of the third subset of foam injectors contact the object, thereby controlling an orientation of the object relative to the array of foam injectors.

13. The method of claim 12, wherein:

the one or more ports is configured for injecting the liquid foam from the body; and the injecting step comprises injecting the liquid foam through the one or more ports of each body of the second subset of foam injectors.

14. The method of claim 9, wherein:

each foam injector includes an actuator coupled to the respective body, the actuator being configured to translate the body along the third direction; and each translating step comprises actuating respective ones of the actuators.

15. The method of claim 14, wherein each actuating step is performed under control of a control unit in communication with each actuator.

* * * * *